United States Patent [19]

Matsumura et al.

[11] 4,415,708

[45] Nov. 15, 1983

[54] THREE STAGE GRAFT POLYMERIZATION PROCESS FOR PREPARING NITRILE BASED RESINS

[75] Inventors: Shoichi Matsumura; Yoshihiko Hashimoto; Hiroyasu Furukawa; Masaaki Azuma, all of Kobe, Japan

[73] Assignee: Kanegafuchi Kagaku Kogyo Kabushiki Kaisha, Osaka, Japan

[21] Appl. No.: 302,754

[22] Filed: Sep. 16, 1981

Related U.S. Application Data

[63] Continuation of Ser. No. 108,472, Dec. 31, 1979, abandoned.

[30] Foreign Application Priority Data

Dec. 30, 1978 [JP] Japan .................... 48-165054

[51] Int. Cl.$^3$ ............... C08F 279/02; C08F 279/04
[52] U.S. Cl. ........................ 525/316; 525/310; 525/315
[58] Field of Search ............... 525/316, 310, 315

[56] References Cited

U.S. PATENT DOCUMENTS

| | | | |
|---|---|---|---|
| 3,542,905 | 11/1970 | Nishioka et al. | 525/316 |
| 3,751,526 | 8/1973 | Okasaka et al. | 525/316 |
| 3,887,652 | 6/1975 | Carrock et al. | 525/316 |
| 3,950,455 | 4/1976 | Okamoto et al. | 525/316 |
| 3,991,136 | 11/1976 | Dalton et al. | 525/316 |
| 4,002,811 | 1/1977 | Hendy | 525/316 |
| 4,009,227 | 2/1977 | Ott et al. | 525/316 |
| 4,112,021 | 9/1978 | Shima et al. | 525/316 |
| 4,120,851 | 10/1978 | Chi et al. | 525/316 |
| 4,151,128 | 4/1979 | Ackerman et al. | 525/316 |
| 4,154,778 | 5/1979 | Ohya et al. | 525/310 |

*Primary Examiner*—Wilbert J. Briggs, Sr.
*Attorney, Agent, or Firm*—Moonray Kojima

[57] ABSTRACT

A nitrile based resin produced by graft polymerizing in the presence of a rubber, a first group of monomers in a first polymerization step, then a second group of monomers in a second polymerization step, and then a third group of monomers in a third polymerization step; wherein the resin comprises (A) 5 to 25 parts by weight of the rubber and (B) 75 to 95 parts by weight of (I) 5 to 40 weight percent of the product of the first polymerization step comprising $\lambda$ weight percent unsaturated nitrile and $100-X$ weight percent vinyl compound having aromatic vinyl compound as an essential element; (II) 2 to 35 weight percent of the product of the second polymerization step comprising Y weight percent unsaturated nitrile and $100-Y$ weight percent vinyl compound having aromatic vinyl compound as an essential element; and (III) 25 to 93 weight percent of the product of the third polymerization step comprising Z weight percent unsaturated nitrile and $100-Z$ weight percent vinyl compound having aromatic vinyl compound as an essential element, wherein $$30 \leq X < Y < Z \leq 85$$

$$30 \leq X < 60;$$

$$60 < Z \leq 85.$$

The resin has excellent gas barriering property, chemical resistance, fluidity and high impact resistance.

3 Claims, No Drawings

THREE STAGE GRAFT POLYMERIZATION PROCESS FOR PREPARING NITRILE BASED RESINS

This is a continuation, of application Ser. No. 108,472, filed Dec. 31, 1979, now abandoned.

BACKGROUND OF THE INVENTION

This invention relates to a polymer composite having high impact resistance, excellent processibility, excellent gas barriering property and chemical resistance; and method of producing the same.

The nitrile based resin having a relatively high unsaturated nitrile content excels in gas barriering property and chemical resistance. Thus, such resin has been used as packaging material and as other industrial material. A copolymer made from acrylonitrile and aromatic vinyl compound is not thermally deformable even at a relatively high temperature. Thus, when it is strengthened with rubber, in particular, its usefullness increases. However, the polymerizability is so widely different between acrylonitrile and aromatic vinyl compound that when the conventional radical polymerization process is carried out, the composition produced at an earlier polymerization stage shows a considerable difference from the composition produced at a later polymerization stage. As a result, the final product tends to be heterogeneous with lower impact resistance and lower thermal stability.

To be more specific, in conventional radical polymerization process, the highly reactive aromatic vinyl compound is apt to polymerize at an earlier stage to give a copolymer which contains the aromatic vinyl compound richer than the starting material contains, whereas the less reactive acrylonitrile polymerizes at a later stage to give a copolymer which contains a large amount of acrylonitrile. For this reason, various proposals have been put forth in the art for producing a homogeneous copolymer or for strengthening a copolymer with rubber.

Among the proposed processes, for example, is Japanese Patent Publication No. 33574/1971, which discloses a method wherein an aromatic vinyl compound is added to acrylonitrile steadily in the presence of diene based rubber so as to keep constant the refluxing temperature. Japanese Patent Publication No. 16347/1973 discloses a method wherein monomers composition are gas chromatographically traced in the reaction system and monomers are added to maintain a constant composition, thereby to produce a copolymer with homogeneous composition. However, disadvantageously such a method does not produce a high yield. In Japanese Patent Publication No. 1950/1974, there is disclosed a method wherein a reactive compound is added to the polymerization system according to the degree of heat evolved.

All of the foregoing proposals have in common alleged production of a uniform copolymer by preliminarily preparing a certain composition of monomer mixture in order that a copolymer may be obtained in the predetermined composition, and while tracing the reaction progress, adding a part of the monomer mixture to the reaction system so as to retain the initial composition. Nevertheless, in these proposals, there have been and are many unresolved problems, such as, the heat evolved during polymerization can hardly be removed on account of the initial amount of monomers put in a reactor being too plentiful. Moreover, the reaction progress has to be continuously monitored. The monomers must be added with great care according to the progress of the reaction. Furthermore, the operation and equipment employed must be complicated to obtain a uniform copolymer. In addition to these deficiencies and difficulties, and regardless of the uniformity of the obtained copolymer, the fluidity of the produced copolymer is substantially deficient.

SUMMARY OF THE INVENTION

Accordingly, the present inventors have made an intensive study to eliminate and improve upon the aforementioned and other deficiencies and disadvantages of the prior art. They have improved the fluidity and impact resistance without adversely affecting the gas barriering property and chemical resistance.

The invention encompasses a process wherein rubber, as defined herein, is graft polymerized with a monomer mixture comprising unsaturated nitrile and aromatic vinyl compound in a first polymerization step, with a monomer mixture comprising unsaturated nitrile and aromatic vinyl compound in a second polymerization step, and with a monomer mixture comprising unsaturated nitrile and aromatic vinyl compound in a third polymerization step; wherein the compositions of the three monomer mixtures used in the first, second and third polymerization steps are carefully varied in specified ranges.

The end product is a high nitrile content based resin comprising (A) 5 to 25 parts by weight of rubber and (B) 75 to 95 parts by weight of (I) 5 to 40 weight percent of the product of the first polymerization step comprising X weight percent unsaturated nitrile and $100-X$ weight percent vinyl compound having aromatic vinyl compound as an essential element; (II) 2 to 35 weight percent of the product of the second polymerization step comprising Y weight percent unsaturated nitrile and $100-Y$ weight percent vinyl compound having aromatic vinyl compound as an essential element; and (III) 25 to 93 weight percent of the product of the third polymerization step comprising Z weight percent unsaturated nitrile and $100-Z$ weight percent vinyl compound having aromatic vinyl compound as an essential element; wherein $$30 \leq X < Y < Z \leq 85;$$

$$30 \leq X < 60;$$

$$60 < Z \leq 85.$$

The resin has excellent gas barriering property, chemical resistance, fluidity and impact strength.

The rubber, as used herein, comprises at least 50 weight percent 1,3-conjugated diene. The vinyl compound comprises aromatic vinyl compound as an essential element. Up to 80% by weight of the aromatic vinyl compound may be replaced by other vinyl compounds, as discussed below, without decreasing the attainable effect of the invention.

The aromatic vinyl compound content of the vinyl compound used in the first, second and third polymerization steps is preferably not less than 20 weight percent, or more preferably not less than 40 weight percent. One of the most important aspects of this invention is the low proportion of unsaturated nitrile in the first step polymerization product. The present inventors have discovered that to obtain the advantageous fluidity of this nitrile based resin of this invention, it is important that the proportion of unsaturated nitrile be lower in the graft polymer than in the polymer and further that the nitrile proportion in the second polymerization step be placed between those in the first polymerization step and in the third polymerization step.

DETAILED DESCRIPTION OF PREFERRED EMBODIMENTS

The rubber, or otherwise called herein 1,3-diene based polymer, may be a single polymer composed entirely of 1,3-diene monomer, or a copolymer composed of at least 50 weight percent 1,3-diene and the remainder one or more monomers which are copolymerizable with the 1,3-diene. Among the 1,3-diene usable for this purpose are 1,3-butadiene, isoprene and chloroprene. The monomers copolymerizable with these 1,3-dienes are exemplified by styrene, substituted styrene, alpha methylstyrene, substituted alpha methyl styrene, acrylonitrile, alkylacrylate, such as methyl, ethyl, propyl, and n-butyl acrylate and alkyl methacrylate. These monomers may be used singly or in combination. Moreover, polyfunctional monomers such as divinyl benzene, polyethylene glycol dimethacrylate, allyl acrylate and the like, are able to be subjected to this copolymerization in order to produce a cross linking structure in a diene based rubber.

In such diene based polymers, there must be contained at least 50 weight percent diene monomer. When less than 50 weight percent 1,3-diene is used, the glass transition temperature of the rubber rises and the impact resistance cannot be sufficiently imparted to the final product. The 1,3-diene based rubber can be produced by various conventional processes. Briefly, any process such as bulk polymerization, solution polymerization, emulsion polymerization and suspension polymerization can be used. The emulsion polymerization is preferred. The mean diameter of the diene based rubber latex is preferably from 0.05 to 0.2 micron. This range is not necessarily limiting of the later diameter.

The graft copolymer of this invention can be produced by polymerization of unsaturated nitrile with a vinyl compound in the presence of the diene based rubber. As the unsaturated nitrile, acrylonitrile and/or meth acrylonitrile and the like can be used.

The vinyl compound used in the first, second and third polymerization steps, comprises at least one aromatic vinyl compound as an essential element. However, up to 80 weight percent of the aromatic vinyl compound can be replaced by a vinyl monomer or monomer mixture other than the above, which contains not less than 30 weight percent of alkyl acrylate and/or alkyl methacrylate. In this case, not more than 30 weight percent of the other vinyl monomers, which is not aromatic vinyl compound, nor acrylate, nor methacrylate, such as vinyl ether, vinyl ester or the like can also be employed in an amount (e.g. 0 to 20 weight percent) so that the desired properties of the inventive resin are not adversely affected.

To be more specific, the aromatic vinyl compounds, such as styrene, substituted styrene, alpha methyl styrene, substituted alpha methyl styrene and the like can be used. The alkyl radical of alkyl acrylate and alkyl methacrylate comprising methyl, ethyl, n-propyl and n-butyl radicals and those having 1 to 4 carbon atoms, may be used.

The composition of the product of the first polymerization step should contain 30 of 60 weight percent, more preferably 45 to 55 weight percent, unsaturated nitrile and 70 to 40 weight percent vinyl compound. When the amount of the unsaturated nitrile is less than 30 weight percent, the affinity of the product of the first polymerization step with the product of the second polymerization step becomes inferior and the impact resistance is reduced. When the amount of unsaturated nitrile is more than 60 weight percent, the processing ability decreases and yellowing coloration problems arise.

The composition of the product of the third polymerization step should contain 60 to 85 weight percent unsaturated nitrile and 40 to 15 weight percent vinyl compound. When the amount of unsaturated nitrile is less than 60 weight percent, the product tends to become weak in chemical resistance. When the amount is more than 85 weight percent, processability is adversely affected. Moreover, the difference in amounts of unsaturated nitriles used in the first polymerization step and the third polymerization step should be more than 5 percent.

The proportion of unsaturated nitrile in the product of the second polymerization step should be between those in the products of the first and third steps respectively. The reason for this constraint is to impart to the first and the third step polymers, the binding force which will serve to increase the affinity and impact resistance of both polymers. Moreover, the proportion of the unsaturated nitrile in the second polymerization step product (designated as Y weight percent) should be between X (designated as the weight percent of unsaturated nitrile in the product of the first polymerization step) and Z (designated as the weight percent of unsaturated nitrile in the product of the third polymerization step). It is preferred to use a value close to the mean, i.e. $(X+Z)/2$, as a convenient measure. When the second step polymer needs to be produced, the monomer mixture should contain unsaturated nitrile in an amount slightly less than the mean value should be added at an early stage of polymerization and another part of the mixture containing slightly more than the mean value should be added at a later stage of polymerization so as to vary the monomer composition in reaction continuously according to the reaction progress. In the production of the graft polymer, the monomer charging rate may be changed according to the reactivity of the unsaturated nitrile and the vinyl monomer, but the monomer composition can be more easily changed to obtain the similar results because of the simplicity.

The amount of rubber contained in the final graft polymer is 5 to 25 parts by weight, per 100 parts by weight of the final graft polymer. When the rubber content is less than 5 parts by weight, the impact resistance is insufficient. When the rubber content is more than 25 parts by weight, the gas barriering and chemical resistance properties are adversely affected.

In the final graft polymer, the amount of the product of the first polymerization stage is preferably between 5 to 40 weight percent and more preferably between 10 to 35 weight percent When less than 5 weight percent are used, the processing ability is not improved. When it is more than 40 weight percent the gas barriering property and chemical resistance are adversely affected. The amount of the product of the second polymerization step is preferably between 2 to 35 weight percent. When it is less than 2 weight percent, the impact resistance cannot be improved. When it is more than 35 weight percent the chemical resistance is adversely affected. The amount of the product of the third polymerization stage is preferably between 25 and 93 weight percent. Below 25 weight percent has adverse affects on the processibility. Above 93 weight percent has adverse affects on the properties desired. The percentages referred to in this paragraph are those of the non-rubber component of the graft polymer.

In this invention, to polymerize the unsaturated nitrile with the vinyl compound in the presence of the conjugated diene containing rubber, any conventional polymerization process may be employed, such as solution polymerization, bulk polymerization, emulsion polymerization, or a combination of these processes. It is advantageous from a practial standpoint to employ emulsion polymerization. In carrying out emulsion polymerization, it will be advisable to add predetermined amounts of monomers to the reaction system dividedly or continuously.

In this way a latex product is obtained. The latex is then coagulated, rinsed, dried and then subjected to calendering blowing, and then molded by injection or extrusion process after applying an antioxidant, a stabilizer, a lubricant, or a pigment according to desire or necessity.

The nitrile based resin thus obtained excels in gas-barriering property, fluidity, chemical resistance and has superior impact resistance. Thus, the inventive resin has a highly practical and commercial value.

The invention will now be further illustrated by way of actual examples, which examples are not to be construed in any limiting sense.

The terms "parts" and "percents" as used herein are in terms of weight, unless otherwise stated.

EXAMPLE 1

(A) Production of Diene-based Rubber Latex

|  | Parts |
|---|---|
| 1, 3-butadiene | 75 |
| Styrene | 25 |
| Triethylene glycol dimethacrylate | 1.2 |
| t-dodecyl mercaptane | 0.25 |
| Semi-hardened soda soap from tallow | 2.0 |
| Hydrogenated potassium rhodinate | 1.0 |
| Condensed naphthalene sodium sulfonate | 0.2 |
| (ethylene diamine tetraacetato)disodium complex | 0.002 |
| ferrous sulfate hepta hydrate | 0.001 |
| formaldehyde sodium sulfite | 0.1 |
| paramentan hydroperoxide | 0.1 |
| deionized water | 200 |

All of the above main and auxiliary starting materials were placed in a tightly sealed pressure reactor and polymerization reaction was carried out at 40° C. for 10 hours with stirring, while oxygen was being exhausted from the system. The conversion rate of the monomers into polymer was 98 percent. Electron micrographs showed that the mean diameter of the produced latex was 0.06 micron.

(B) Production of the Nitrile-Based Resin.

|  | Parts |
|---|---|
| Diene-based rubber latex (as dried solid) | 10 |
| GAFAC RE-610 (emulsifier) | 0.5 |
| Sodium dioctyl sulfosuccinate | 1.0 |
| (ethylene diamine tetraacetato)disodium complex | 0.005 |
| deionized water | 200 |
| acrylonitrile | 8 |

All of the above materials were placed in a polymerization reactor. While the mixture was being maintained at 60° C. in a nitrogen stream with stirring, 0.12 part of potassium persulfate was added. Immediately thereafter, a first group of monomers set forth in Table 1 was continuously added to the reaction system extending over 2 hours. After 15 minutes interval, a second group of monomers in Table 1 was continuously added thereto extending over 1.5 hours. Again after 15 minutes interval, the third group of monomers set forth in Table 1 was continuously added thereto extending over 2 hours. The polymerization reaction was completed 30 minutes later. Samplings of a few milliliter of the latex solution were made a certain intervals in order to examine the polymer composition through gas chromatograph, which detected the residual monomers and determined the composition of the yielded polymers. After completion of the polymerization, the latex was cooled below 50° C., coagulated with calcium chloride, heat treated to 80° to 90° C., then washed, filtered and dried.

To 100 parts of the powdery resin obtained as above, was added 0.5 part of di-tert-butylhydroxy toluene. This mixture was made into pellets by an extruder equipped with a vent. Then the pellets were shape into an Izod bar to test it at 23° C. The fluidity of the resin was determined by means of the Koka type flow tester (manufactured by Shimadzu Seisakusho, ltd) The following test conditions were used. Temperature, 220° C.; load, 100 kg/cm$^2$; nozzle diameter, 1.0 mm; nozzle length, 10 mm. From this test, the flow rate of the resin was determined and the flow index (FI) was estimated in units of $10^{-2}$ cc/sec.

COMPARATIVE EXAMPLE 1.

The composition of monomers used is shown in Table 1. The components described in Example 1, Step (B) were also used. When the composition of the first monomer group was out of the range of the invention, there arose problems in fluidity or Izod result.

TABLE 1

|  | Example 1B-1 | | | Example 1B-2 | | | Example 1B-3 | | | Example 1B-4 | | |
|---|---|---|---|---|---|---|---|---|---|---|---|---|
|  | AN | ST | MMA | AN | ST | MMA | AN | ST | MMA | AN | ST | MMA |
| The composition of 1st Monomer group (30 parts) (%) | 55 | 31.5 | 13.5 | 45 | 38.5 | 16.5 | 50 | 50 |  | 55 | 45 |  |
| The composition of 2nd monomer group (22 parts) (%) | 60 | 28 | 12 | 65 | 24.5 | 10.5 | 62.3 | 37.7 |  | 60 | 40 |  |
| The composition of 3rd monomer group (30 parts) (%) | 75 | 17.5 | 7.5 | 80 | 14.0 | 6.0 | 77.5 | 22.5 |  | 75 | 17.5 | 7.5 |
| The composition of 1st step polymerization production (%) | 53 | 33.0 | 14.0 | 42.5 | 40.0 | 17.5 | 48.0 | 52.0 |  | 53.5 | 36.5 |  |
| Composition of 2nd step polymerization product (%) | 58.0 | 29.5 | 12.5 | 62.5 | 26.5 | 11.0 | 61.0 | 39.0 |  | 58.5 | 31.5 |  |
| Composition of 3rd step | 77 | 16.0 | 7.0 | 81.5 | 13.0 | 5.5 | 78 | 22 |  | 77.5 | 16.5 | 6.0 |

TABLE 1-continued

| | | | | | | | | | | | |
|---|---|---|---|---|---|---|---|---|---|---|---|
| Conversion Rate | | 94.0 | | | 93.0 | | | 93.3 | | | 93.5 |
| FI | | 1.7 | | | 2.6 | | | 1.8 | | | 2.0 |
| Izod (kg · cm/cm²) | | 11.6 | | | 6.0 | | | 12.3 | | | 7.3 |

| | Example 1B-5 | | | Comparative Example 1B-6 | | | Comparative Example 1B-7 | | | Comparative Example 1B-8 | | |
|---|---|---|---|---|---|---|---|---|---|---|---|---|
| | AN | ST | MMA | AN | ST | MMA | AN | ST | MMA | AN | AN | MMA |
| The composition of 1st monomer group (30 parts) (%) | 55 | 31.5 | 13.5 | 25 | 52.5 | 22.5 | 70 | 21.0 | 9.0 | 45 | 38.5 | 16.5 |
| The composition of 2nd monomer group (22 parts) (%) | 60 | 28 | 12 | 79.5 | 14.4 | 6.1 | 72.7 | 19.1 | 8.2 | 74.0 | 18.2 | 7.8 |
| The composition of 3rd monomer group (30 parts) (%) | 75 | 25 | | 90 | 7.0 | 3.0 | 50 | 35 | 15 | 74.0 | 18.2 | 7.8 |
| Composition of 1st step polymerization product (%) | 53.0 | 33.0 | 14.0 | 22.0 | 54.5 | 23.5 | 67.0 | 23.0 | 10.0 | 42.5 | 40.0 | 17.5 |
| Composition of 2nd step polymerization product (%) | 58.0 | 29.5 | 12.5 | 78.0 | 15.5 | 6.5 | 70.0 | 20.0 | 10 | 75.5 | 17.0 | 7.5 |
| Composition of 3rd step polymerization product (%) | 77.5 | 22.4 | 0.1 | 87.0 | 9.0 | 4.0 | 52.0 | 33.5 | 14.5 | 76.5 | 16.2 | 7.3 |
| Conversion Rate | | 93.0 | | | 92.0 | | | 55.6 | | | 93.5 | |
| FI | | 1.6 | | | 4.3 | | | 0.2 | | | 2.5 | |
| Izod (kg · cm/cm²) | | 10.5 | | | 2.0 | | unable to mold | | | | 4.0 | |

NOTES:
(1) To 30 parts of the 1st monomer group, 2 parts n-dodecyl mercaptane (n-DM) was added.
(2) AN = Acrylonitrile; ST = Styren; MMA = Methyl methacrylate.
(3) As to comparative example 1B-8, compositions of the 2nd and 3rd monomer groups were made identical so that this compared to the two step polymerization, and not to the three step polymerization.

Compared with the results of omission of the second step composition, the results of the invention are superior in impact strength.

EXAMPLE 2B-1

By use of the rubber produced in Example 1, Step (A), the following prescription was made.

| | Parts |
|---|---|
| Diene-based rubber latex (dried solid) | 10 |
| GAFAC RE-610 (emulsifier) | 0.5 |
| Sodium dioctylsulfosuccinate | 1.0 |
| HCl (36% concentration) | 0.1 |
| (ethylene diamine tetraacetato)disodium complex | 0.005 |
| Deionized water | 200 |
| Acrylonitrile | 8 |

All of these above materials were placed into a polymerization reactor. While the mixture was being maintained at 60° C. in the Nitrogen stream with stirring, 0.12 part of potassium persulfate was added. The first monomers group comprising 10 parts AN, 5.6 parts ST, 2.4 parts MMA, and 0.8 n-DM was continuously added to the reaction system extending over 1.5 hour. After 15 minutes interval, the second monomer group comprising 19.5 parts AN, 7.35 parts ST, 3.15 parts MMA, and 1.2 parts n-DM was continuously added extending over 2 hours. After 15 minutes interval, the additional monomer group comprising 22.5 parts AN, 4.55 parts ST and 1.95 parts MMA was continuously added extending over 2 hours. Immediately after the completion of the second addition, the third monomers group comprising 3.5 parts ST and 1.5 parts MMA was continuously added extending over 1 hour. The polymerization was conducted for 1 more hour. The after treatment was carried out in the same manner as described in Example 1, step (B).

COMPARATIVE EXAMPLE 2B-2

To 18 parts of a first monomer group comprising 52 parts An, 17.5 parts ST, and 7.5 parts MMA, was added 0.8 part n-DM and the mixture was continuously added extending over 1.5 hours, while keeping the monomer charging rate constant. After that, a mixture was prepared by adding 1.2 parts n-DM to 30 parts of the aforementioned monomer mixture was continuously added extending over 2 hours. Then, 29 parts of the mixture thus obtained was continuously added extending over 2 hours. And to this mixture were added 3.5 parts ST, and 1.5 parts MMA continuously over 1 hour. Polymerization was carried out further for 1 hour and the after treatment was made as in Example 1, step (B). The results are shown in Table 2.

TABLE 2

| | Example 2B-1 | | | Comparative Example | | |
|---|---|---|---|---|---|---|
| | AN | ST | MMA | AN | ST | MMA |
| Composition of 1st monomer group (%) | 55.0 | 31.5 | 13.5 | 64.5 | 25.0 | 10.5 |
| Composition of 2nd monomer group (%) | 64.0 | 25.0 | 11 | 65 | 24.0 | 11.0 |
| Composition of 3rd monomer group (%) | 76.5 | 16.5 | 7.0 | 66 | 23.5 | 10.5 |
| FI | | 2.3 | | | 0.3 | |
| IZOD | | 7 | | unable to mold | | |

EXAMPLE 3B

To the same mixture as described in Example 2B-1, the following monomers for the graft polymerization were added as follows: The first step charging (5.5 parts AN, 3.15 parts ST, 1.35 parts MMA, and 0.5 part n-DM) extending over 40 minutes→ 15 minutes interval→The second step charging (5.8 parts AN, 2.94 parts ST, 1.26 parts MMA and 0.5 parts n-DM) extending over 40 minutes→no interval→The third step charging (6.1 parts AN, 2.73 parts ST, 1.17 parts MMA, and 0.5 part n-DM) extending over 40 minutes→no interval→- The fourth step Charging (6.4 parts AN, 2.52 parts ST, 1.08 parts MMA, and 0.5 part n-DM) extending over 40 minutes→15 minutes interval→The fifth step charging (28.2 parts AN, 6.16 parts ST, and 2.64 parts MMA) extending over 2.5 hours→no interval→The sixth step charging (3.5 parts ST and 1.5 parts MMA) extending over 1 hour, and the polymerization reaction was carried out for a further 1 hour.

The later after treatment was carried out in the same way as discussed in Example 2, step (B). The composition of the first step polymerization product proved to be as follows: An, 53%; ST, 33%; and MMA, 14%. The conversation rate proved to be 95%. The powdery resin was then divided into two parts, that is, acetonitrile-soluble part and acetonitrile-insoluble part. Elementary analysis showed that the acetonitrile soluble part contained 67.3% AN, 22.9% ST and 9.8% MMA. The acetonitrile insoluble part contained graft polymer comprising 53.5% AN, 33.1% ST and 13.4% MMA. In general, the composition of the grafte part, which is insoluble in acetonitrile or dimethyl formamide, can be estimated from infrared spectroscopy or vibron as rubber composition or rubber quantity, or otherwise can be determined through conventional elementary analysis. In this example, the Jetermined result of rubber composition and rubber quantity well coincided with the empirical values.

The foregoing description is illustrative of the principles of the invention. Numerous variations and modifications thereof would be apparent to the worker skilled in the art. All such variations and modifications are to be considered to be within the spirit and scope of the invention.

What is claimed is:

1. A nitrile based resin produced by graft polymerizing in a first polymerization step, in the presence of a rubber comprising at least 50 weight percent 1,3-conjugated diene, a first group of monomers, and in which first polymerization step said first group of monomers is substantially completely polymerized; then, in a second consecutive and separate polymerization step, grafting onto the product of said first polymerization step, a second group of monomers, until said second group of monomers is substantially completely polymerized; and finally, in a third consecutive and separate polymerization step, grafting onto the product of said second polymerization step, a third group of monomers until said third group of monomers is substantially completely polymerized; said resin thus produced by said three consecutive and separate steps of polymerization, consisting essentially of (A) 5 to 25 parts by weight of said rubber consisting essentially of at least 50 weight percent 1,3-conjugated diene, remainder one or more monomers copolymerizable therewith; and (B) 75 to 95 parts by weight of the following:

(I) 5 to 40 weight percent of said product of said first polymerization step consisting essentially of "X" weight percent first component selected from the group consisting of acrylonitrile, methacrylonitrile and mixtures thereof, and "100−X" weight percent second component consisting essentially of 20 to 100 weight percent aromatic vinyl compound selected from the group consisting of styrene, substituted styrene, alpha methyl styrene and substituted alpha methyl styrene, 0 to 80 weight percent of a monomer consisting essentially of 30 weight percent or more alkyl acrylate and/or alkyl methacrylate, and not more than 30 weight percent of vinyl monomers excluding said aromatic vinyl compound, said alkyl acrylate and said alkyl methacrylate;

(II) 2 to 35 weight percent of said product of said second polymerization step consisting essentially of "Y" weight percent third component selected from the group consisting of acrylonitrile, methacrylonitrile, and mixtures thereof, and "100−Y" weight percent fourth component consisting essentially of 20 to 100 weight percent aromatic vinyl compound selected from the group consisting essentially of styrene, substituted styrene, alpha methyl styrene, and substituted alpha methyl styrene, 0 to 80 weight percent of a monomer consisting essentially of 30 weight percent or more alkyl acrylate and/or alkyl methacrylate, and not more than 30 weight percent of vinyl monomers excluding said aromatic vinyl compound, said alkyl acrylate and said alkyl methacrylate; and (III) 25 to 93 weight percent of said product of said third polymerization step consisting essentially of "Z" weight percent fifth component selected from the group consisting of acrylonitrile, methacrylonitrile and mixtures thereof, and "100-Z" weight percent sixth component consisting essentially of 20 to 100 weight percent aromatic vinyl compound selected from the group consisting of styrene, substituted styrene, alpha methyl styrene and substituted alpha methyl styrene, 0 to 80 weight percent of a monomer consisting essentially of 30 weight percent or more alkyl acrylate and/or alkyl methacrylate, and not more than 30 weight percent of vinyl monomers excluding said aromatic vinyl compound, said alkyl acrylate and said alkyl methacrylate; and wherein the amount of said first component, of said third component, and of said fifth component are governed by the following ranges:

$$30 \leq X < 60;\ 30 \leq X < Y < Z \leq 85;\ 60 < Z \leq 85.$$

2. The resin of claim 1, wherein said alkyl acrylate and/or said alkyl methacrylate comprises 0 to 20 weight percent in each of said first, second and third polymerization steps.

3. The resin of claim 1, wherein the difference between said "Z" and said "X" is at least 5 weight percent.

* * * * *